United States Patent
Janssen et al.

[15] 3,699,732
[45] Oct. 24, 1972

[54] COLLAPSIBLE LINER FOR SILO CHUTE

[72] Inventors: Gail E. Janssen; Henry N. Wildenberg, both of Kaukauna, Wis.

[73] Assignee: Badger Northland, Inc., Kaukauna, Wis.

[22] Filed: March 8, 1971

[21] Appl. No.: 121,913

[52] U.S. Cl....................52/195, 193/25 C, 222/527
[51] Int. Cl. ........E04h 7/00, B65g 11/10, B65d 5/06
[58] Field of Search..193/25 R, 25 C, 25 E; 222/527, 222/530; 52/192, 195, 196, 186

[56] References Cited

UNITED STATES PATENTS

| | | |
|---|---|---|
| 3,428,156 | 2/1969 | Charyn et al.........193/25 R X |
| 1,258,759 | 3/1918 | Floehr......................193/25 R |
| 2,772,764 | 4/1956 | McClellan.............193/25 E X |
| 3,163,280 | 12/1964 | Haugland.................193/25 R |

*Primary Examiner*—Evon C. Blunk
*Assistant Examiner*—H. S. Lane
*Attorney*—Gerhardt, Greenlee & Farris

[57] ABSTRACT

A collapsible discharge chute liner, for an upright silo having a plurality of doors and a vertical discharge chute, including a funnel assembly, a flexible tube, and a flexible tube storage assembly. The funnel includes hooks which hold it in communication with any of the silo doors and tight against the side of the silo. A flexible tube is attached to and supported by the assembly. A flexible tube storage assembly is provided to store excess flexible tube material for reuse as the funnel assembly is lowered from one of the silo doors to the next silo door. The flexible tube storage assembly may include a chamber assembly connected to a conveyor at the bottom of the silo with an inlet pipe having a flange on its upper end. The inlet pipe extends up into the flexible tube and excess flexible tube material is stored on the inlet pipe in an accordion folded condition. For installations where a chamber assembly is undesirable, a reel upon which the flexible tube can be wound may be provided. With a reel for the storage of the flexible tube, a zipper is provided, to open an opening for silage, in the side of the flexible tube.

6 Claims, 4 Drawing Figures

INVENTORS.
GAIL E. JANSSEN
BY HENRY N. WILDENBERG
Gerhardt, Greenlee & Farris
ATTORNEYS.

INVENTORS.
GAIL E. JANSSEN
BY HENRY N. WILDENBERG

ATTORNEYS.

COLLAPSIBLE LINER FOR SILO CHUTE

This invention relates to an upright silo for the storage of silage for livestock and more particularly to a reusable collapsible discharge chute liner for a silo discharge chute.

Upright silos are commonly used to store silage for livestock. The silage is generally removed from these silos by feeding systems which remove the silage either from the top or the bottom of the silo and distribute the silage in a livestock feed bunk. This invention is directed to a silo which has an unloader to remove the silage from the top of the silo.

Silos which are unloaded from the top have a vertical row of doors which extend from the bottom of the silo to the top. These doors close a passage from the inside the silo to a vertical silo discharge chute on the outside of the silo wall. A silo unloader inside the silo removes silage from the top of the silage pack and conveys it into the vertical silo discharge chute. The silage falls down the silo discharge chute and into the hopper of a conveyor system which conveys the silage to livestock feed bunks. As the silage is removed from the silo, it is necessary for the operator to climb up the inside of the silo discharge chute to open the doors through which the silage is conveyed by the silo unloader and to service the silo unloader.

The silage which falls through the silo discharge chute makes the chute quite dusty. Due to the dust and the silage which sticks in the silo discharge chute, the job of climbing up the inside of the chute to open the doors and to service the silo unloader is very objectionable. By providing a collapsible discharge chute liner for the silo discharge chute, it is possible to keep the discharge chute clean and relatively dust free so that the operator can, if he so desires, climb up the inside of the silo discharge chute with the unloader running.

The improved collapsible discharge chute liner of this invention is for an upright silo having a plurality of doors and a vertical discharge chute. The collapsible discharge chute liner includes a funnel assembly, a flexible tube attached to and supported by the funnel assembly to hang vertically within the silo discharge chute and a flexible tube storage assembly near the bottom of the vertical discharge chute for storing excess flexible tube material.

The flexible tube may include a zipper capable of opening the side of the flexible tube for the passage of material from the flexible tube if desired. With this opening capability provided for the flexible tube, the flexible tube storage assembly includes a reel upon which the flexible tube is wound in a collapsed flat state.

The flexible tube storage assembly preferably includes a chamber adopted to be connected to a conveyor and an inlet pipe extending up from the chamber and into the flexible tube. The pipe extending up into the flexible tube includes a flange on its upper end. A section of the inlet pipe below the flange has a reduced circumference capable of storing at least part of the flexible tube in an accordian folded condition. The flexible tube storage assembly may include a band to clamp the flexible tube to the inlet pipe extending up from the chamber. The funnel assembly may include a spout extending down into the flexible tube including a flange on its lower end and a section with a reduced circumference capable of storing at least part of the flexible tube in an accordian folded condition. A band is provided to clamp the flexible tube to the funnel assembly.

The nature of the invention will be more clearly understood by reference to the following detailed description and the accompanying drawing in which.

While the invention will be described in connection with certain preferred embodiments, it will be understood that the invention is not intended to be limited to those embodiments. The invention includes all alternatives, modifications and equivalents as may be included within the spirit and scope of the invention as defined by the appended claims.

Figures 1, 2:
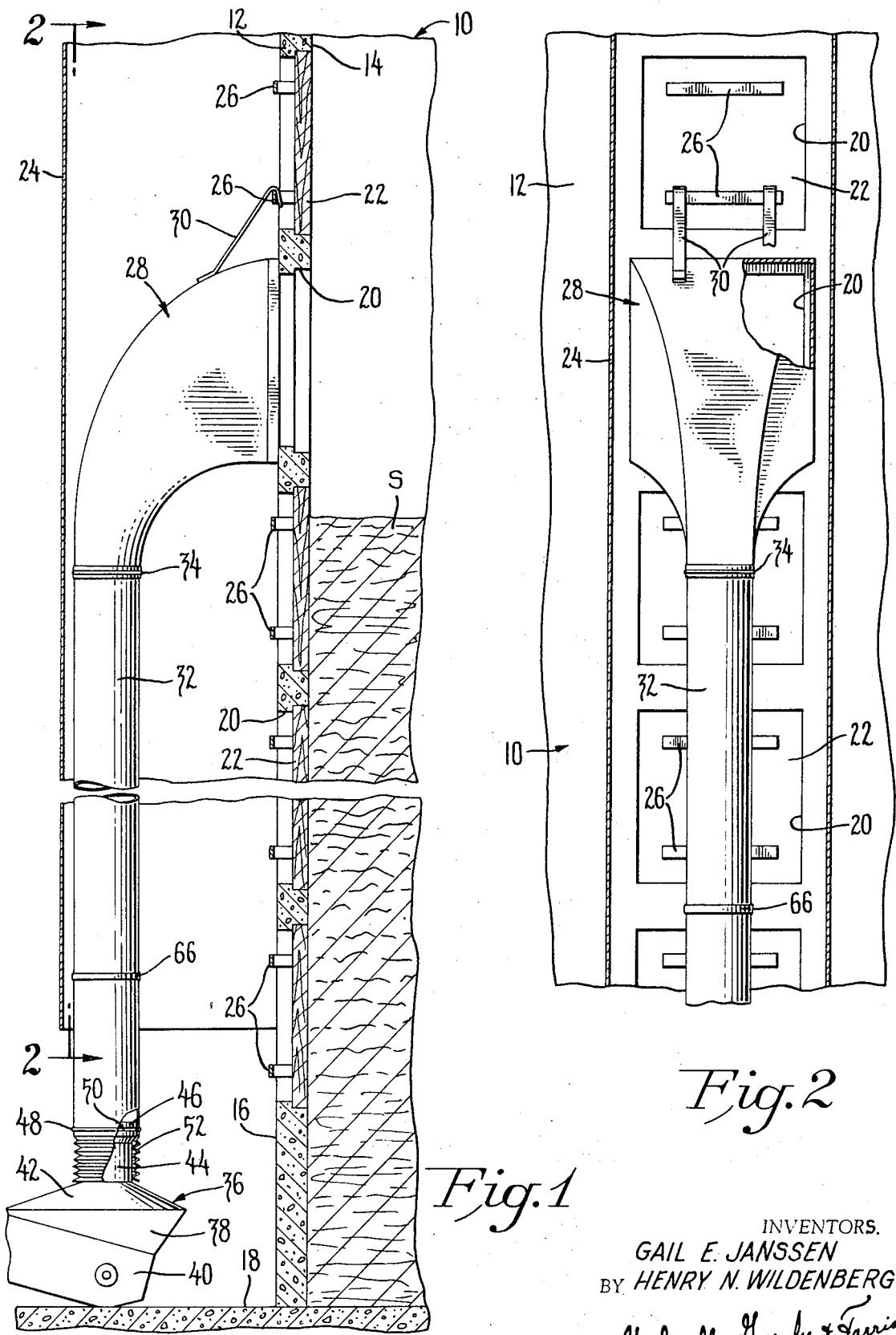
FIG. 1 is an elevational view partly broken away in section of a portion of an upright silo and a silo discharge chute with the collapsible discharge chute liner of this invention.
FIG. 2 is a fragmentary sectional view taken along lines 2—2 of FIG. 1 showing the funnel assembly construction of the collapsible discharge chute liner and the silo doors with parts broken away in section.

There is shown in FIG. 1 a portion of a standard upright silo 10. The silo 10 includes an upright wall 12 with an inner surface 14 and an outer surface 16 supported on a foundation 18. The upright wall 12 of the silo 10 is preferably circular. A plurality of rectangular opening 20 are provided in the upright wall 12 of the silo 10. The rectangular openings 20 are arranged in a vertical row. A door 22 is provided for each of the rectangular openings 20.

A silo discharge chute 24 is mounted on the outer surface 16 of the silo wall 12 over the rectangular openings 20. The silo discharge chute 24 extends down from the top of the silo wall 12 to a point some distance above the bottom of the silo 10. The silo discharge chute 24 is spaced above the bottom of the silo 10 a distance sufficient to provide space for a conveyor to carry the silage to a livestock feed bunk.

Each of the doors 22 for the rectangular openings 20 in the silo wall 12 has a pair of U-shaped bars 26 on its outer surface 16. The U-shaped bars 26 provide handles for opening and closing the doors 22 and also form a ladder for the operator to climb up the inside of the silo discharge chute 24.

The U-shaped bars 26 also support a funnel assembly 28. The funnel assembly 28 includes a pair of hooks 30 which hook to the U-shaped bar 26 on one of the doors 22 to support the funnel assembly 28 in communication with one of the rectangular openings 20. The hooks 30 support the funnel assembly 28 so that a tight seal is formed between the funnel assembly 28 and the outer surface 16 of the silo wall 12 all around the rectangular opening 20. As silage S is removed from the silo 10 the funnel assembly 28 is moved down from one of the rectangular openings 20 to the next lower rectangular opening 20.

The funnel assembly 28 receives silage from a silo unloader and directs it vertically downward. The silo unloader can either blow silage through the rectangular opening 20 with an impeller, or silage can be conveyed through the rectangular opening 20 by a conveyor. A collapsible discharge chute liner 32 is attached to the funnel assembly 28 to receive the silage directed downward by the funnel assembly. The collapsible discharge chute liner 32 is a flexible tube formed from plastic and attached to the funnel assembly 28 by a band 34. The collapsible discharge chute liner 32 extends vertically downward inside the silo discharge chute 24 from the funnel assembly 28 to a chamber assembly 36.

The chamber assembly 36 includes a hopper 38, a cover member 42, and a vertical inlet pipe 44. The hopper 38 is attached to a conveyor 40 which is only partially shown. The cover member 42 is attached to the top of the hopper 38. The vertical inlet pipe 44 is attached to and extends up from the cover member 42. A flange 46 is formed on the upper end of the vertical inlet pipe 44. The collapsible discharge chute liner 32 fits over the flange 46 on the vertical inlet pipe 44 of the chamber assembly 36. A band 48 on the outside of the collapsible discharge chute liner 32 holds the liner in the groove 50 in the flange 46. Excess flexible tube material 52 from the collapsible discharge chute liner 32 is accordian folded on the vertical inlet pipe 44 below the flange 46.

Figure 3:
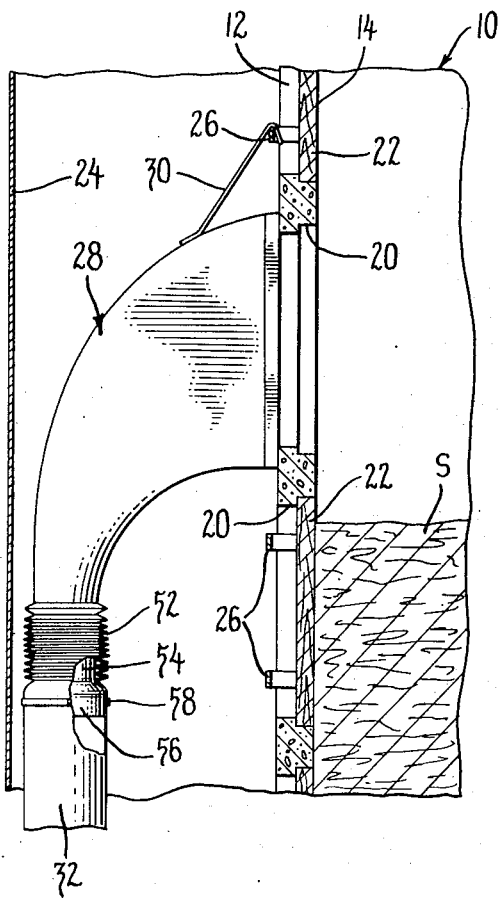
FIG. 3 is a sectional view of a portion of the silo similar to FIG. 1 showing a modification of the funnel assembly and the flexible tube of the collapsible discharge chute liner with parts broken away in section.

In FIG. 3, a similar arrangement is shown for the outlet spout 54 of the funnel assembly 28. The outlet spout 54 is somewhat smaller in circumference that the circumference of the collapsible discharge chute liner 32. A flange 56 is formed on the lower end of the outlet spout 54. The collapsible discharge chute liner 32 is clamped to the funnel assembly 28 by a band 58. Excess flexible tube material 52 can be pulled up over the flange 56 and accordian folded on the outlet spout 54.

The funnel assembly 28 as shown in FIG. 1 does not have an outlet spout with a reduced circumference for the storage of excess flexible tube material 52. The storage capacity of vertical inlet pipe 44 of the chamber assembly 36 is preferably sufficient to hold all the flexible tube material 52, making it unnecessary to provide an outlet spout with reduced circumference on the funnel assembly for the storage of excess flexible tube material 52.

Figure 4:
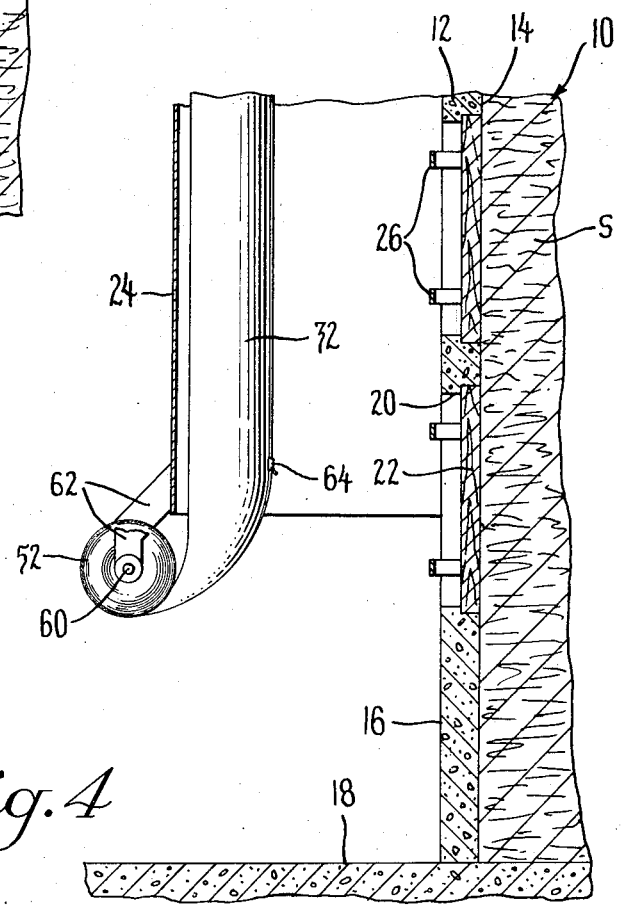
FIG. 4 is a sectional view of a portion of the silo similar to FIG. 1 showing an alternate storage assembly for excess flexible tube material at the bottom of the silo.

The storage assembly shown in FIG. 4 for the storage of excess flexible tube material 52 includes a reel 60 journaled on a pair of support arms 62. The support arms 62 are attached to the silo discharge chute 24 as illustrated. With this particular storage assembly, it is necessary to provide a zipper 64 which can open or close the side of the collapsible discharge chute liner 32 from one end to the other. The zipper 64 makes it possible for the side of the collapsible discharge chute liner 32 to be opened up to provide an exit for silage.

The collapsible discharge chute liner 32 can be provided with connections 66 as shown in FIGS. 1 and 2 if desired. The connection can be used to add or remove sections of the collapsible discharge chute liner 32 if it is necessary to increase or decrease the total length of the collapsible discharge chute liner. However, the collapsible discharge chute liner 32 is preferably a continuous flexible plastic tube.

In operation, the funnel assembly 28, with the collapsible discharge chute liner 32 attached by a band 34, is supported inside the silo discharge chute 24 adjacent to one of the rectangular openings 20 near the top of the silo. The door 22 for the rectangular opening 20 covered by the funnel assembly 28 is open so that silage S can pass from the silo unloader in the silo, through the rectangular opening 20 into the funnel assembly 28 and through the collapsible discharge chute liner 32. When the level of the silage S in the silo has been lowered sufficiently, the door 22 immediately below the funnel assembly 28 is opened, the door 22 adjacent to the funnel assembly 28 is closed and the funnel assembly 28 is lowered to a position adjacent to the rectangular opening 20 which is not closed by a door 22. After the funnel assembly 28 has been lowered, it is necessary to take up the excess flexible tube material 52 from the collapsible discharge chute liner 32. The easiest way to take up the excess material is to remove the band 48 from the groove 50 in the flange 46 on the chamber assembly 36. After the band 48 has been removed, the collapsible discharge chute liner 32 is slid down over the flange 46 as far as it will go and the excess flexible tube material 52 is accordian folded on the vertical inlet pipe 44 of the chamber assembly 36. The band 48 is placed in the groove 50 and the collapsible discharge chute liner 32 is ready to be used. If the vertical inlet pipe 44 of the chamber assembly 36 cannot hold all the excess flexible tube material 52 as the funnel assembly 28 is lowered, a section of the collapsible discharge chute liner 32 can be removed by disconnecting one of the connections 66 or the material can be slid up over a flange 56 on the funnel assembly 28 as shown in FIG. 3. With the chamber assembly 36, the top of the silo may be essentially sealed and dust at the bottom of the silo discharge chute 24 is practically eliminated.

In some installations it is not possible to use the chamber assembly 36. An example of such an installation would be one where the silage falls from the collapsible discharge chute liner 32 into something other than a conveyor on which a stationary hopper can be mounted. With an installation of this type, after the funnel assembly 28 is lowered, the collapsible discharge chute liner 32 is opened at the bottom of silo discharge chute 24 with a zipper 64 as shown in FIG. 4. The excess flexible tube material 52 is then flattened and rolled up on the reel 60. If desired, the silo can be sealed when not in use by closing the opening with the zipper 64 or by clamping the collapsible discharge chute liner 32 shut.

We claim:

1. An improved collapsible discharge chute liner for an upright silo having a plurality of doors through a vertical wall for the discharge of silage and a vertical discharge chute covering the doors characterized by a funnel assembly supported inside the vertical discharge chute adjacent to at least one of the doors in sealing contact with the silo wall to substantially limit the passage of silage between the funnel and the silo wall, and a flexible tube attached to and supported by the funnel assembly to hang vertically within the discharge chute.

2. The improved collapsible discharge chute liner of claim 1 characterized by a flexible tube storage assembly near the bottom of the vertical discharge chute including a chamber adapted to be connected to a conveyor and an inlet pipe extending up from the chamber and into the flexible tube.

3. The improved collapsible discharge chute liner of claim 2 characterized by the inlet pipe extending up into the flexible tube including a flange on its upper end and a section with a reduced circumference capable of storing at least part of the flexible tube in an accordian folded condition.

4. The improved collapsible discharge chute liner of claim 3 characterized by the flexible tube storage assembly including a band to clamp the flexible tube to the inlet pipe extending up from the chamber.

5. The improved collapsible discharge chute liner of claim 2 characterized by the funnel assembly including attaching means to secure the funnel assembly to the side of the silo, a spout extending down into the flexible tube and a band to clamp the flexible tube to the funnel assembly.

6. The improved collapsible discharge chute liner of claim 5 characterized by the spout of the funnel assembly extending down into the flexible tube including a flange on its lower end and a section with a reduced circumference capable of storing at least part of the flexible tube in an accordian folded condition.

* * * * *